(12) United States Patent
Jiang

(10) Patent No.: US 10,343,212 B2
(45) Date of Patent: Jul. 9, 2019

(54) HARDFACING CONTAINING TUNGSTEN CARBIDE PARTICLES WITH BARRIER COATING AND METHODS OF MAKING THE SAME

(71) Applicant: Wenhui Jiang, Pearland, TX (US)

(72) Inventor: Wenhui Jiang, Pearland, TX (US)

( * ) Notice: Subject to any disclaimer, the term of this patent is extended or adjusted under 35 U.S.C. 154(b) by 238 days.

(21) Appl. No.: 15/391,251

(22) Filed: Dec. 27, 2016

(65) Prior Publication Data

US 2018/0178283 A1    Jun. 28, 2018

Related U.S. Application Data

(60) Provisional application No. 62/280,292, filed on Jan. 19, 2016.

(51) Int. Cl.

| | |
|---|---|
| *B22F 1/02* | (2006.01) |
| *B23K 35/02* | (2006.01) |
| *C22C 19/05* | (2006.01) |
| *C04B 35/56* | (2006.01) |
| *C04B 35/628* | (2006.01) |

(Continued)

(52) U.S. Cl.
CPC ............ *B22F 1/025* (2013.01); *B23K 35/025* (2013.01); *B23K 35/0227* (2013.01); *B23K 35/0261* (2013.01); *C04B 35/5626* (2013.01); *C04B 35/62828* (2013.01); *C04B 35/62831* (2013.01); *C04B 35/62836* (2013.01); *C04B 35/62897* (2013.01); *C22C 14/00* (2013.01); *C22C 16/00* (2013.01); *C22C 19/058* (2013.01); *B22F 2301/205* (2013.01); *B22F 2999/00* (2013.01);

(Continued)

(58) Field of Classification Search
USPC .......... 175/434, 374, 375; 75/236, 252, 240; 148/622
See application file for complete search history.

(56) References Cited

U.S. PATENT DOCUMENTS

| | | |
|---|---|---|
| 3,049,435 A | 8/1962 | Shwayder |
| 5,876,793 A | 3/1999 | Sherman |

(Continued)

FOREIGN PATENT DOCUMENTS

GB    2450611 A  * 12/2008 ................ B22F 1/02

OTHER PUBLICATIONS

Brust, CVD Coating of Oxide Particles for the Production of Novel Particles-Reinforced Iron-Based Metal Matrix Composites, Open Journal of Applied Science, Apr. 27, 2016, pp. 260-269, 2016-6, Scientific Research Publishing, Wuhan, China.

*Primary Examiner* — Nina Bhat

(57) ABSTRACT

A composite composition comprising tungsten carbide particles having a barrier coating and a binder is described, which is used as hardfacing materials. The tungsten carbide particles comprise at least one kind of cast tungsten carbide, carburized tungsten carbide, macro-crystalline tungsten carbide and sintered tungsten carbide. The barrier coating comprises at least one of metal carbides, borides, nitrides, carbonitrides, carboborides, nitroborides and carbonitroborides. The binder alloys take one of the forms selected from a welding/brazing tube, rod, rope, powder, paste, slurry and cloth, which are suitable for being applied by various welding or brazing methods. The barrier coating would prevent or mitigate the degradation of the tungsten carbide particles due to attack of a molten binder alloy during a welding or brazing process.

17 Claims, 3 Drawing Sheets

(51) Int. Cl.
    *C22C 14/00*    (2006.01)
    *C22C 16/00*    (2006.01)
    *C22C 29/08*    (2006.01)

(52) U.S. Cl.
    CPC ............ *C04B 2235/3843* (2013.01); *C04B 2235/5436* (2013.01); *C22C 29/08* (2013.01)

(56) References Cited

U.S. PATENT DOCUMENTS

| | | | | |
|---|---|---|---|---|
| 6,372,012 | B1* | 4/2002 | Majagi | B22F 3/156 |
| | | | | 75/232 |
| 6,537,397 | B1* | 3/2003 | Sugawara | C21D 1/18 |
| | | | | 148/612 |
| 7,303,030 | B2 | 12/2007 | Lockwood | |
| 3,056,652 | A1 | 11/2011 | Lockwood | |
| 8,056,652 | B2* | 11/2011 | Lockwood | B22F 1/02 |
| | | | | 175/331 |
| 8,617,289 | B2* | 12/2013 | Lockstedt | B23K 35/327 |
| | | | | 175/375 |
| 8,875,813 | B2* | 11/2014 | Zhan | B24D 3/02 |
| | | | | 175/434 |
| 9,103,004 | B2* | 8/2015 | MacLeod | C22C 26/00 |
| 2006/0081681 | A1 | 4/2006 | Pipkin | |
| 2008/0073127 | A1* | 3/2008 | Zhan | B24D 3/02 |
| | | | | 175/434 |
| 2008/0314646 | A1* | 12/2008 | Lockwood | B22F 1/02 |
| | | | | 175/374 |

* cited by examiner

HARDFACING CONTAINING TUNGSTEN CARBIDE PARTICLES WITH BARRIER COATING AND METHODS OF MAKING THE SAME

CROSS-REFERENCE TO RELATED APPLICATION

This application claims the benefit of U.S. Provisional Patent Application Ser. No. 62/280,292, filed on Jan. 19, 2016, titled "Tungsten Carbide Particles with Barrier Coating for Hardfacing Applications," the disclosure of which is incorporated herein in its entirety by this reference.

BACKGROUND OF THE INVENTION—PRIOR ART

The following is a tabulation of some prior arts that presently appear relevant:

| U.S. Patents | | | |
|---|---|---|---|
| Patent Number | Kind Code | Publication Date | Patentee |
| 3,049,435 | A | 1962 Aug. 14 | Shwayder |
| 7,303,030 | B2 | 2007 Dec. 4 | Lockwood et al. |
| 8,056,652 | B2 | 2011 Nov. 15 | Lockwood et al. |
| 5,876,793 | A | 1999 Mar. 2 | Sherman et al. |

| U.S. Patent Application Publications | | | |
|---|---|---|---|
| Publication Number | Kind Code | Publication Date | Applicant |
| 20060081681 | A1 | 2006 Apr. 20 | Pipkin |

Hardfacings (they are also referred to as hardbandings for tubulars of earth boring tools such as drill pipes) are hard coatings over metallic substrate surfaces and have higher hardness than metallic substrates, so as to improve their abrasive wear and erosion resistances. Hardfacings are widely used in machinery, mining, agriculture, construction, and oil and gas industries. Hardfacings can be divided into thin and thick ones. Thin hardfacings usually have a thickness of not more than 50 μm. Typical techniques for preparing the thin hardfacings include physical vapor deposition (PVD), chemical vapor deposition (CVD), electroless/electrical plating, chemical heat treatments such as carburizing, carbonitriding, nitriding, and boriding, surface mechanical processing, etc. On the other hand, the thick hardfacings generally have a thickness of more than 50 μm, up to several millimeters, or even larger. The thick hardfacings are usually prepared by welding or brazing methods. The main techniques include laser cladding, plasma transferred arc (PTA) welding, consumable and non-consumable electric arc welding, oxyacetylene flame welding and brazing, or furnace brazing, etc. The thick hardfacings are made of either uniform metals and alloys, or metallic matrix composites (MMCs) with discrete hard phase particles as reinforcements. Tungsten carbide particles are the most commonly used reinforcements in the MMC hardfacings, due to their extraordinarily high hardness.

MMC hardfacings generally have 40-80 wt. % of tungsten carbide particles embedded in balanced binder alloys. The hard tungsten carbide particles act as anti-wear components and the tough binder matrices are their holders. The binder alloys are generally ferrous metals (iron, cobalt, and nickel) or their alloys. There are five common methods to prepare such the hardfacings. (i) Dropping particles: tungsten carbide particles alone may be dropped into a molten pool during welding such as gas metal arc welding (GMAW) or gas tungsten arc welding (GTAW) operations. (ii) Spraying powder: premixed powder materials of tungsten carbide particles and binder alloy particles may be sprayed onto a substrate surface during welding or brazing. This process is used in oxyacetylene spray & fuse, laser cladding, or PTA. (iii) Preformed coating: a slurry, paste, or cloth containing carbide particles and binder materials may be applied to a substrate surface and subsequently, it is heated for brazing in a furnace or with induction coils. Usually, such the brazing processes are performed in vacuum or an inert atmosphere. (iv) Rod: a welding or brazing rod may be prepared by placing a mixture of tungsten carbide particles, deoxidizer, alloying elements, and binder material into a metal tube. A substrate may be hardfaced by progressively melting a welding or brazing rod onto a selected surface of the substrate and allowing the melted material to solidify and form a desired hardfacing. (v) Rope: a brazing rope consists of a metallic wire as a core and its skin material comprising a mixture of tungsten carbide particles, deoxidizer, alloying elements, and binder materials. A substrate may be hardfaced by progressively melting a brazing rope onto a selected surface of the substrate and allowing the melted material to solidify and form hardfacing. An oxyacetylene torch is usually used for heating.

The tungsten carbide herein includes cast tungsten carbide (also known as fuse tungsten carbide), carburized tungsten carbide, macro-crystalline tungsten carbide, and sintered tungsten carbide. The cast tungsten carbide is eutectic WC and $W_2C$. The carburized tungsten carbide is a product of a solid-state diffusion of carbon into tungsten metal powders or particles at high temperatures in a protective atmosphere. Usually, the carburized tungsten carbide is polycrystalline monotungsten carbide (WC). The macro-crystalline tungsten carbide is essentially stoichiometric tungsten carbide (WC) created by a thermite process. Most of the macro-crystalline tungsten carbide is in the form of single crystals. The sintered tungsten carbide (also known as cemented tungsten carbide) is a composite of tungsten carbide and a metal binder made through powder metallurgy method. The metallic binder is commonly cobalt, and sometimes nickel, iron, or their alloys. Recently, binderless sintered tungsten carbide containing hardly any metallic binder was developed. Various tungsten carbides have different mechanical, physical, and chemical properties, such as hardness and toughness. All these types of tungsten carbides are commonly used in hardfacings in either single or combined forms, which depends on different application occasions.

A portion of tungsten carbide material may be lost by vaporization, oxidation, or dissolution during welding or brazing processes, when manufacturing MMC hardfacings with tungsten carbide particles as reinforcements. Ferrous binder materials (iron, cobalt, nickel, or their alloys) act as a dissolving agent for the tungsten carbide. Since the price of the tungsten carbide is high, the loss of this material is expensive. More seriously, dissolved tungsten and carbon atoms would enter into a binder matrix, and as a result, would lead to formation of some detrimental brittle phases such as eta phase ($M_6C$) precipitates, which would reduce the toughness of the binder and embrittle the matrix substantially.

U.S. Pat. No. 3,049,435 discloses a process for applying tungsten carbide particles onto a workpiece surface. The tungsten carbide particles are coated with a nickel or nickel-phosphorus alloy. This coating acts as a barrier coating for tungsten carbide particles to protect them from degeneration. Thus, there is a reduced loss of the tungsten carbide in application of the particles to a workpiece. However, it is noted that the nickel or nickel-phosphorus alloy as a metallic coating is vulnerable in a binder alloy melt and it would disappear very soon during welding or brazing.

U.S. Pat. No. 7,303,030, B2 discloses a technique of coating tungsten carbide particles with a barrier layer for improving hardfacing material. The hardfacing with the tungsten carbide particles with a barrier coating as reinforcements is for drilling bits. The tungsten carbide used is sintered tungsten carbide. The carbide size is 420 to 1190 μm (16 to 40 mesh). The barrier coating is a metal layer that is formed from at least one of cobalt, nickel, iron, or alloys thereof, whose thickness is from 5 to 76 μm. The methods for coating tungsten carbide particles are electroless plating, electrical plating, and atmospheric pressure CVD. The invention prevents or reduces the formation of a "halo" around a carbide that indicates the dissolution of the carbide.

Metals or alloys as coating materials may not have sufficiently high melting points and especially, their solubility to binder materials (iron, cobalt, nickel, or their alloys) is high. Thus, it can be deduced that as a barrier, the metal or alloy coatings would have a limited protection for the tungsten carbide particles.

U.S. Pat. No. 8,056,652 B2 discloses a technique of coating tungsten carbide particles with a barrier layer using atomic layer deposition for improving hardfacing material onto drilling bits. The tungsten carbide particles comprise cemented tungsten carbide particles. The barrier coating comprises a layer of ceramic material disposed on the abrasive particles. The barrier coating comprises a thickness ranging from about 1 to 500 nanometers (nano-sized coating). The ceramic layer includes metal oxides, carbides, nitride, etc. The invention reduces coating thickness to a nanometer scale.

In U.S. Pat. No. 8,056,652 B2, the nano-sized oxide coating may survive attack from a binder alloy melt during hardfacing, as the oxides have high thermodynamic stability and very little chemical interaction with a binder matrix. But, the oxides have an incoherent interface with a binder of iron, cobalt, nickel, or their alloys, and thus, their bonding strength is low. On the other hand, the nano-sized carbides and borides are too thin to survive attack from a binder alloy melt during hardfacing, even though they can generate a coherent or semi-coherent interface with a binder alloy.

In U.S. Pat. No. 8,056,652 B2, the coating of the carbide particles may have multiple layers, i.e., an interior ceramic layer and an exterior metallic layer. However, as discussed before, a metallic coating layer is vulnerable to a binder alloy melt and it would disappear very soon during welding or brazing due to the attack from a binder alloy melt. No much protection from an exterior metallic coating layer is expected.

While these coatings may improve some properties, these hardfacing compositions may have limitations. Accordingly, there exists a continuing need for improving hardfacing materials, especially for laser cladding, PTA, and electric arc welding where extremely high heat inputs are involved during welding or brazing processes.

Embodiments of this disclosure will improve hardfacing qualities and performances including abrasion and erosion wear resistances, and especially impact resistance with higher toughness. The improved hardfacing material will find wide applications in machinery, mining, agriculture, construction, and oil and gas industries.

SUMMARY OF THE INVENTION

Some embodiments of the present disclosure relate to a composite composition comprising tungsten carbide particles having a barrier coating disposed thereon, and a binder alloy, which is used as hardfacing materials. The tungsten carbide particles comprise at least one type of cast tungsten carbide, carburized tungsten carbide, macro-crystalline tungsten carbide, and sintered tungsten carbide. The barrier coating comprises at least one of metallic carbides, borides, nitrides, carbonitrides, carboborides, nitroborides and carbonitroborides. The barrier coating has a thickness larger than 1 μm. Methods of manufacturing such the tungsten carbide particles with the barrier coating are selected from CVD, PVD, and thermoreactive deposition/diffusion (TD). The composite composition is in one of forms of only carbide particle/powder, mixed powder of carbide and binder material, rod, tube, rope, brazing paste, slurry and cloth. Hardfacing processes are welding or brazing processes are selected from electric arc welding, oxyacetylene welding or brazing, induction welding or brazing, PTA, laser cladding and furnace brazing.

This summary is provided to introduce a selection of concepts that are further described in the following detailed description. The summary is not intended to identify specific features of the claimed subject matter, nor is it intended to be used as an aid in limiting the scope of the claimed subject matter. Complete features of embodiments of this disclosure will be set forth in the description and appended claims.

Figure 1:
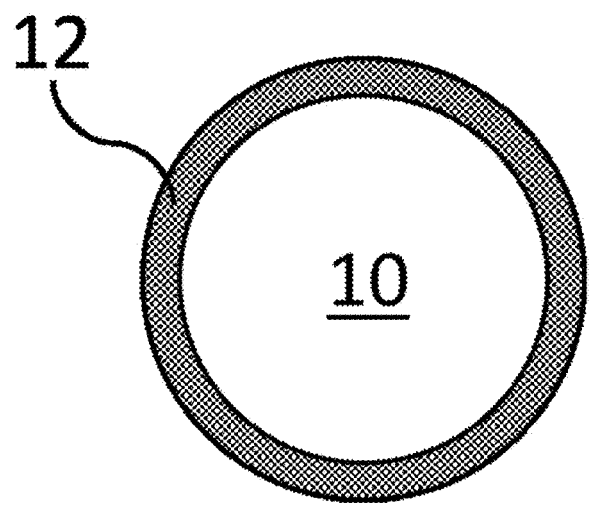
FIG. 1 shows a tungsten carbide particle coated with one layer in accordance with the present disclosure.

DRAWING—REFERENCE NUMERALS 10 tungsten carbide;
12 coating layer selected from the group consisting of metallic carbides, borides, nitrides, carbonitrides, carboborides, nitroborides and carbonitroborides;
20 coating layer of ceramics, metals, or alloys; and
30 coating layer of metals or alloys.

DETAILED DESCRIPTION OF THE INVENTION

Embodiments of the disclosure relate to providing a composite composition comprising tungsten carbide particles having a barrier coating disposed thereon, and a binder alloy, which is used as hardfacing materials. The composite composition has at least 30 wt. % of the coated tungsten carbide particles. The tungsten carbide particles are selected from at least one type of cast tungsten carbide, carburized tungsten carbide, macro-crystalline tungsten carbide, and sintered tungsten carbide. The barrier coating comprises at least one of metal carbides, borides, nitrides, carbonitrides, carboborides, nitroborides and carbonitroborides.

Carburized tungsten carbide is a product of solid-state diffusion of carbon into tungsten metal particles or powders at high temperatures in a protective atmosphere. Usually, it is polycrystalline monotungsten carbide (WC). In this disclosure, the carburized tungsten carbide also comprises a cast tungsten carbide that is subject to carburizing. Cast tungsten carbide is a eutectic phase of WC and $W_2C$. Carburization transforms $W_2C$ into WC at least around the surface layer of the cast tungsten carbide. In a molten metal pool during welding or brazing, WC is more thermodynamically stable than $W_2C$. The carburization would improve the thermodynamic stability of the cast tungsten carbide.

In some embodiments of this disclosure, the sintered tungsten carbide particles are tungsten carbide cemented with cobalt, nickel, iron, or their alloys. The sintered tungsten carbide particles also may be binderless, that is, free of any metallic binders.

In some embodiments of this disclosure, the tungsten carbide particles have a size larger than 20 μm. They are in a spherical or angular (crushed) shape.

In some embodiments of this disclosure, the coatings on tungsten carbide particles consist of at least one of metal carbides, borides, nitrides carbonitrides, carboborides, nitroborides and carbonitroborides. The metal carbides are the carbides of the metals selected from the group consisting of titanium (Ti), niobium (Nb), zirconium (Zr), vanadium (V), tantalum (Ta), hafnium (Hf) and chromium (Cr). The metal borides are the borides of the metals selected from the group consisting of Ti, Nb, Zr, V, Ta, Hf and Cr. The metal nitrides are the nitrides of the metals selected from the group consisting of Ti, Nb, Zr, V, Ta, Hf, Cr and Al (aluminum). The carbonitrides are a kind of compounds containing two nonmetal elements of carbon (C) and nitrogen (N). The carboborides are a kind of compounds containing two nonmetal elements of C and boron (B). The nitroborides are a kind of compounds containing two nonmetal elements of N and B. The carbonitroborides are a kind of compounds containing three nonmetal elements of C, N and B. The carbonitrides, carboborides, nitroborides and carbonitroborides comprise at least one metal element selected from the group consisting of Ti, Nb, Zr, V, Ta, Hf, Cr and Al. For example, they may be titanium carbonitride [Ti(CN)], titanium carboboride [Ti(CB)], titanium nitroboride [Ti(NB)], titanium carbonitroboride [Ti(CNB)], etc. All the metal carbides, borides, nitrides, carbonitrides, carboborides, nitroborides and carbonitroborides as mentioned above may comprise more than one metal elements. For example, they may be titanium aluminum nitride [(TiAl)N], titanium tungsten carbide [(TiW)C], titanium tungsten carbonitride [(TiW)(CN)], etc.

These metal carbides, borides, nitrides, carbonitrides, carboborides, nitroborides and carbonitroborides are thermodynamically stable, and their reactions with a metal melt are much smaller than those of the tungsten carbide with the metal melt. Their dissolution rates in the metal melt are lower than those of the tungsten carbide. They can prevent or mitigate the dissolution of the tungsten carbide during welding or brazing operations. Another reason for selecting these compounds as a barrier coating material is that they are not completely insoluble like oxides, but do have a limited solubility in the metal melt and, thus, they can be wetted well by the metal melt. Furthermore, the interface between these compounds and a binder alloy is coherent or semi-coherent and consequently, the bonding between the coated tungsten carbide particles and the binder is metallurgical and strong. Considering that the compounds are soluble in the metal melt, the coating compounds must have a certain amount of thickness. In this disclosure, a coating has a thickness larger than 1 μm, rather than in a nanometer range, so as to keep their effectiveness. During welding or brazing processes, the dissolution of such the coating materials on the tungsten carbide particles would release small amount of elements into the binder and the released elements would alloy the binder matrix. The minor alloying would not degrade the properties of the binder material, but it would rather improve the properties. In fact, the metallic elements selected in the coating compounds in the disclosure are commonly used micro-alloying elements in steels. For example, Ti, Zr, Nb, V, Ta, and Hf are the important constituents in microalloyed steels and they can refine grain structures and generate fine precipitates.

One embodiment of this disclosure is a tungsten carbide particle having a single layer coating. FIG. 1 schematically shows a single layer coating on a tungsten carbide particle. As shown, a tungsten carbide particle 10 may be provided with a single layer coating 12 selected from the group consisting of the metal carbides, borides, nitrides, carbonitrides, carboborides, nitroborides and carbonitroborides, such as those discussed above.

Figure 2:
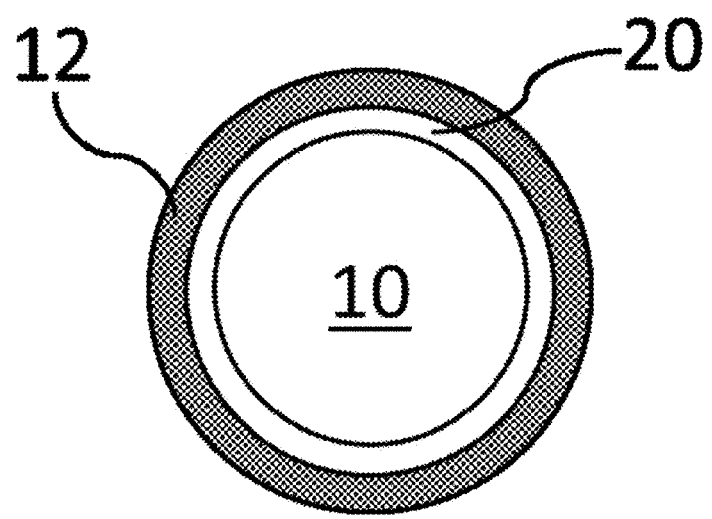
FIG. 2 shows a tungsten carbide particle coated with two layers in accordance with the present disclosure.

Another embodiment of the disclosure is a tungsten carbide particle having a multiple layer coating, wherein an outermost layer coating is selected from the group consisting of the metal carbides, borides, nitrides, carbonitrides, carboborides, nitroborides and carbonitroborides, such as those discussed above. FIG. 2 schematically shows a two layer coating for simplifying purpose. As shown, the tungsten carbide particle 10 is provided with an inner layer 20 and the outer layer 12. The outer layer 12 is one of the metal carbides, borides, nitrides, carbonitrides, carboborides, nitroborides and carbonitroborides. The inner layer 20 is one of ceramics, metals, or alloys.

Figure 3:
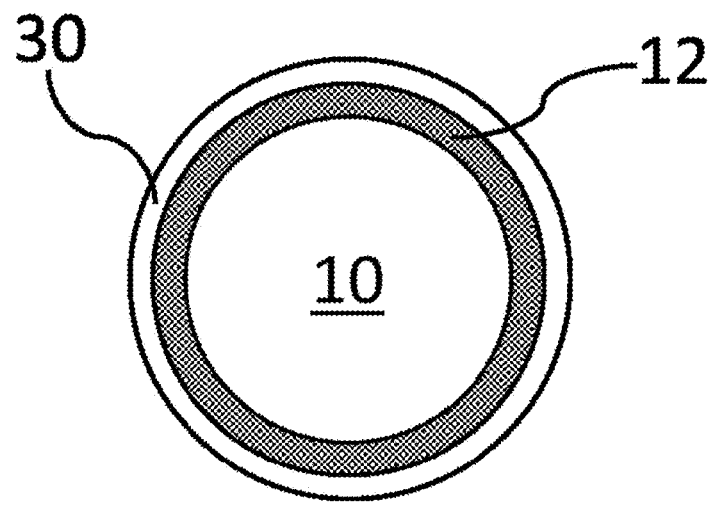
FIG. 3 shows a tungsten carbide particle coated with two layers in accordance with the present disclosure.

Another embodiment of the disclosure is a tungsten carbide particle having a multiple layer coating, wherein an outermost layer is one of metals or alloys. FIG. 3 schematically shows a two layer coating for simplifying purpose. As shown, the tungsten carbide particle 10 may be provided with an outer layer 30 and the inner layer 12. The inner layer 12 is one of the metal carbides, borides, nitrides, carbonitrides, carboborides, nitroborides and carbonitroborides. For such the multiple layer coating, the outermost coating layer 30 is made from metals or alloys, and they are less thermodynamically stable than the metal carbides, borides, nitrides, carbonitrides, carboborides, nitroborides and carbonitroborides in a binder melt during welding or brazing processes. The outermost coating layer 30 of metals or alloys would decompose or dissolve as a sacrifice layer, and the inner coating layer 12 of the metal carbides, borides, nitrides, carbonitrides, carboborides, nitroborides and carbonitroborides would be exposed to the melt, forming an interface between the metal carbides, borides, nitrides, carbonitrides, carboborides, nitroborides and carbonitroborides and the binder in a hardfacing layer, as those discussed above.

In this disclosure, the coatings on tungsten carbide particles aim to prevent or mitigate the dissolution of the tungsten carbide during welding or brazing operations. Partial or even complete dissolution of the coatings may occur during welding or brazing operations, which is dependent on welding or brazing processes. Even though they dissolve completely, the coatings must prevent or mitigate the degeneration of the tungsten carbide particles as reinforcements in a hardfacing layer, because the selected coating compounds have higher thermodynamic stabilities and lower dissolution rates than those of the tungsten carbide particles themselves.

In this disclosure, coatings on tungsten carbide particles can not only prevent or mitigate the degeneration of the tungsten carbide particles, but also can generate a compatible interface with a binder, which would benefit the bonding between the coated tungsten carbide particles and the binder in a hardfacing layer.

Some embodiments of the present disclosure relate to methods of making the coatings on tungsten carbide particles. The methods comprise CVD, PVD, TD, or any other suitable deposition techniques. During CVD or PVD processes, the tungsten carbide particles need to keep motion, so as to coat the particles uniformly, which can be achieved by a fluidized bed, a shaker, a trembler, etc. In fact, fluidized bed CVD or PVD techniques are industrially available for coating particles and powders, which can produce a uniform coating on the particles and powders. For example, U.S. Pat. No. 5,876,793 discloses recirculating fast fluidized bed CVD technique and equipment for coating tungsten carbide powder. TD techniques are commercially available for coating bulk metal components. TD techniques mainly include salt bath immersion coating and pack cementation. TD processing may be used to form a coating of metal carbide, carbonitride, boride, nitride, carbonitrides, carboborides, nitroborides and carbonitroborides on tungsten carbide particles. For example, U.S. Appl. Pat. No. 2006/0,081,681 A1 teaches coating diamond grits with a metal carbide using TD-pack cementation method. Other deposition techniques can be employed, if desired.

TD techniques are thermoreactive deposition processes of a strong carbide-, boride- or nitride-forming element on surface of a substrate containing carbon, boron, or nitrogen to produce a carbide, boride, nitride, carbonitride, carboboride, nitroboride and carbonitroboride layer of that element. With the author's best knowledge, TD techniques have not been used for coating tungsten carbide particles. TD techniques require that a surface of a substrate has a certain amount of carbon, boron, or nitrogen. Therefore, if needed, a thermal diffusion, i.e. carburization, carbonitriding, boriding, or nitriding may be applied to tungsten carbide particles prior to TD processes to enhance the content of carbon, boron, or nitrogen around the surfaces of the tungsten carbide particles. In some cases, TD techniques may generate a multiple layer coating on tungsten carbide particles. An inner coating layer is either carbide, boride, nitride, carbonitride, carboboride, nitroboride or carbonitroboride, and an outer coating layer is either metals or alloys. These coatings that are formed by TD can be further carburized, borided, or nitrided, if an outmost coating layer of metal carbides, borides, nitrides, carbonitrides, carboborides, nitroborides and carbonitroborides is expected, respectively.

Tungsten carbide particles act as main reinforcements in hardfacing that are bonded in a binder alloy. The coated tungsten carbide particles are comprised in welding or brazing materials for hardfacing on metallic article surfaces. The welding or brazing materials can be in a form of only coated tungsten carbide particles/powders, premixed powders of coated tungsten carbide particles and binder materials, rods, tubes, ropes, brazing pastes, or cloths in that the coated tungsten carbide particles are premixed or pre-loaded with a binder material. After welding or brazing, the coated tungsten carbide reinforcing MMC hardfacings form on the article surfaces. The surfaces of the tungsten carbide particles are modified with the coatings to avoid or mitigate the degeneration of the tungsten carbide particles during welding or brazing processes. The welding and brazing processes include electric arc welding, oxyacetylene welding or brazing, induction welding or brazing, PTA welding, laser cladding, furnace brazing, etc.

For arc welding including electric arc and PTA, the coated tungsten carbide particles may be dropped through a feeding hopper in some embodiments into a molten metal pool on an article surface that is generated by arc. Electrode material may act as a binder such as for gas metal arc welding (GMAW). The coated tungsten carbide particles are entrapped into a hardfacing layer during welding. Alternatively, the coated tungsten carbide particles may be filled into a continuous metal/alloy tube such as a steel tube to form a welding tube. The welding tube may comprise the coated tungsten carbide particles with or without some additives such as alloying elements and other hard granules such as diamond or cubic boron nitride. The metal tube material itself may act as a binder of hardfacing. The welding tube may be fed into a molten metal pool generated by arc on an article surface to form hardfacing layers with embedded coated carbide as reinforcements.

For spray & fuse, PTA, or laser cladding, the coated tungsten carbide particles with binder material powders may be fed through a feeding nozzle onto an article surface and melted by a heating source such as oxyacetylene flame for spray & fuse, plasma arc for PTA, or laser beam for laser cladding. The coated tungsten carbide particles and binder powders may be fed using different nozzles. More commonly, the coated tungsten carbide particles are pre-mixed with binder powders to form a powder mixture as a feeding material for hardfacing. After solidification, a hardfacing layer forms with embedded coated tungsten carbide as reinforcements.

For oxyacetylene welding/brazing or gas tungsten arc welding (GTAW) with a rod, the coated tungsten carbide particles may be filled into a metal rod such as a steel rod to produce a welding or brazing rod. The welding or brazing rod may comprise some additives such as alloying elements and deoxidizer. The metal rod material acts as a binder of hardfacing. The welding or brazing rod may be melted by oxyacetylene flame or arc, and deposited onto an article surface. A hardfacing layer with embedded coated tungsten carbide as reinforcements forms.

For oxyacetylene welding or brazing with a rope, the coated tungsten particles may be mixed with alloying elements, deoxidizer, and resin to form a thick coating on a flexible rope with a metal core. The metal core acts as a binder of hardfacing after deposition. The rope may be melted by oxyacetylene flame and deposited onto an article surface. A hardfacing layer forms with embedded coated tungsten carbide particles as reinforcements.

For furnace brazing, the coated tungsten carbide particles may be put into brazing pastes or cloths with mixing with binder materials and some additives such as flux. The pastes or cloths are put onto an article surface to form a green hardfacing compact. Then, the whole article is put into a furnace for brazing. The furnace is heated to a predetermined brazing temperature (above melting point of a binder material) and held for a predetermined period of time. Cooling may be in the furnace or in air. A hardfacing layer forms with embedded coated tungsten carbide particles as reinforcements. Alternatively, induction heating or oxyacetylene flame may be used for brazing.

Example 1: TD—Halide Activated Pack Cementation

Tungsten carbide particles to be coated are 100 g spherical cast tungsten carbide having a size of 45-150 μm. The depositing reactive materials consist of 20 g Ti powders and 12 g ammonium chloride ($NH_4Cl$). $NH_4Cl$ powders are baked around 120° C. for 1 hour before use. All the materials including the tungsten carbide particles, Ti powders, and NH$_4$Cl powders are mixed completely in a ball mill for 4 hours. The mixed powders are loaded inside a stainless steel container with a lid and the container is sealed with alumina paste. An electric resistance furnace with flowing Ar is used to heat the container. The furnace is heated continuously at a heating rate of 10° C./min. and kept at 1000° C. for 2 hours. Then, the furnace cools down to room temperature by turning off power, meanwhile keeping Ar flowing. The powder mixture from the container is crushed in a ball mill and screened using sieves. About 2 μm of TiC coating forms on the tungsten carbide particles.

Example 2: Hardfacing by PTA

Two kinds of hardfacings are prepared using PTA. The difference is in tungsten carbide particles only. Conventional tungsten carbide particles and the coated tungsten carbide as disclosed above are used, respectively. In order to observe effect of barrier coating on tungsten carbide, all the other materials and processing parameters are kept the same. Tungsten carbide is spherical cast tungsten with a size of 45 to 150 μm. The coating on tungsten carbide particles is TiC with a thickness of about 2 μm. A nickel alloy binder is used. Its nominal chemical composition is 0.35-0.45 wt. % C, 1.3-1.9 wt. % Fe, 2.7-4.3 wt. % Si, 1.3-1.9 wt. % B, 8.1-11.0 wt. % Cr, and bal. Ni, and the nominal hardness is HRc 38-43. The binder alloy powders have a size of 45 to 150 μm. The hardfacing materials contain 60 wt. % cast tungsten carbide. A piece of 25 mm×100 mm×12 mm of AISI 4140 steel is used as a substrate. 300 g tungsten carbide particles and 200 g Ni alloy powders are mixed completely. The mixture of tungsten carbide particles and binder alloy powders is loaded into a powder feeder. The used current is 95 A. A carrier gas is Ar and its flowing rate is 3 scfh. A targeting hardfacing thickness is 1.5 mm, which is achieved by one pass. After hardfacing, a cross section metallographic sample is prepared for microstructural observation and microhardness measurement.

Figure 4:
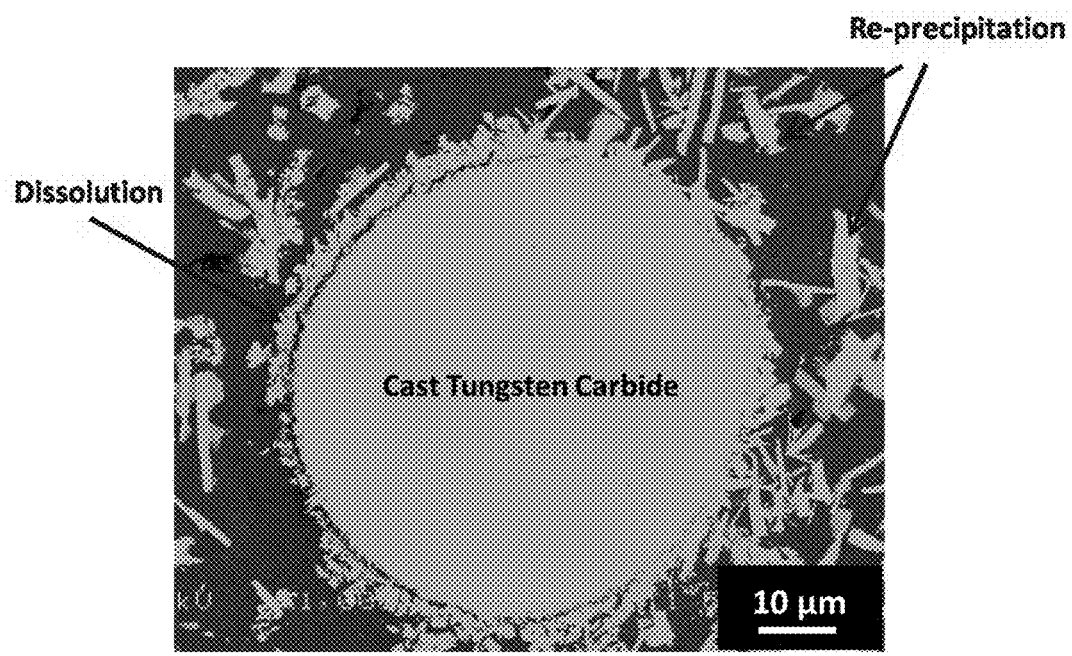
FIG. 4 (prior art) shows a cross section of a tungsten carbide particle without any coating in a hardfacing prepared by PTA; and, FIG. 5 shows a cross section of a tungsten carbide particle with TiC coating in a hardfacing prepared by PTA in accordance with the present disclosure.

FIG. 4 is a micrograph of a cross section of a prior art cast tungsten carbide in the hardfacing layer that is prepared by PTA, which is photographed using a scanning electron microscope. It can be seen that there are substantial dissolution of a tungsten carbide particle and re-precipitation of secondary precipitates.

Figure 5:
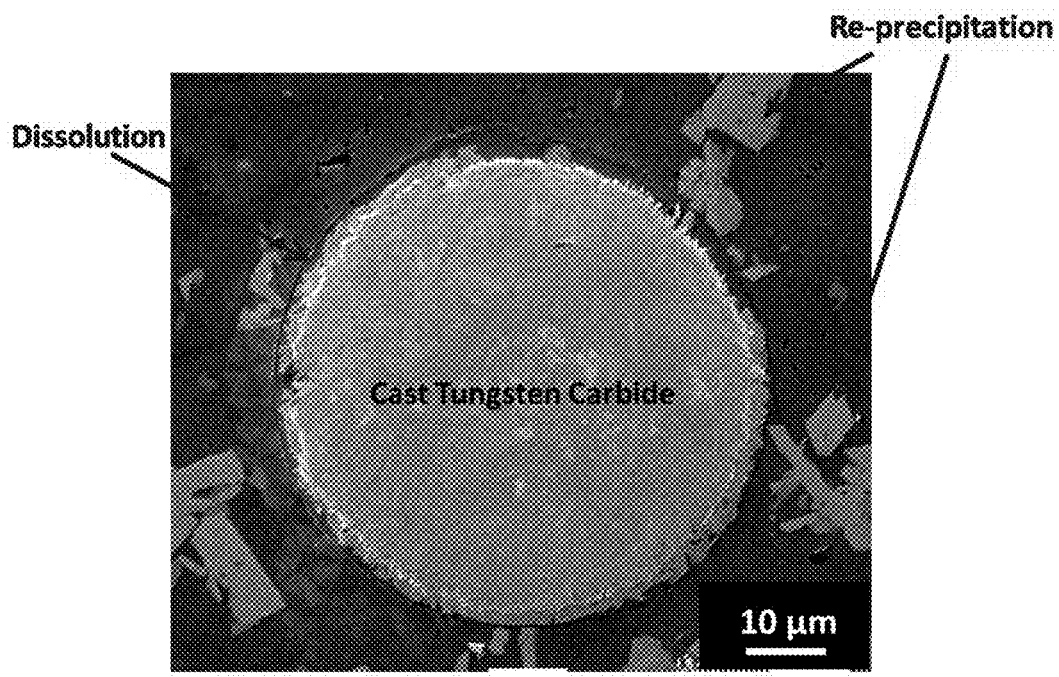

FIG. 5 is a micrograph of a cross section of a cast tungsten carbide having TiC coating in the hardfacing layer that is prepared by PTA in accordance with the disclosure, which is photographed using a scanning electron microscope. Some dissolution of the coated tungsten carbide particle and re-precipitation of secondary precipitates are observed. But, their severities are much less than those in the prior art tungsten carbide particle hardfacing, as shown in FIG. 4. Microhardness measurements show that the binder of the coated tungsten carbide hardfacing has lower hardness than that of the prior art tungsten carbide hardfacing. The average Rockwell C scale hardness (HRc) values of the coated tungsten carbide hardfacing and the prior art tungsten carbide hardfacing are HRc 49.0 and HRc 58.5, respectively, which are converted from the measured microhardness. The increase in binder hardness is attributed to the dissolution of tungsten carbide and re-precipitation of secondary precipitates, that is, the degeneration of tungsten carbide during hardfacing. The increase margin in binder hardness of the coated tungsten carbide hardfacing is significantly lower than that of the prior art tungsten carbide hardfacing. The microstructural observations and hardness measurement indicate that the TiC coating on the tungsten carbide particles can prevent or mitigate the degeneration of the tungsten carbide particles during hardfacing.

Advantageously, embodiments of the present disclosure provide the hardfacing composition comprising tungsten carbide particles that have a barrier coating layer. The barrier coating is the metal carbides, borides, nitrides, carbonitrides, carboborides, nitroborides and carbonitroborides, which have high thermodynamic stability. The coatings on the tungsten carbide particles can not only prevent or mitigate the degeneration of the tungsten carbide particles, but also generate a compatible interface with a binder, which would benefit bonding between the coated tungsten carbide particles and the binder in a hardfacing layer. The coated tungsten carbide particles maintain their sizes after welding or brazing, and more importantly, avoid or mitigate detrimental alloying of the binder with tungsten and carbon that result from the dissolution of the tungsten carbide, and the formation of some brittle phases such as eta phase (M$_6$C), which would cause embrittlement of the binder. Further, the limited dissolution of the coatings on the tungsten carbide particles would add micro-alloying elements such as Ti, Nb, Zr, V, Ta, Hf, or Cr into a binder and thus, improve the properties of the binder. The improved hardfacing materials have a good combination of tough binder, intact tungsten carbide, as well as strong bonding between the tungsten carbide and the binder. All of these features grant the hardfacing layers high qualities and performances including abrasion and erosion wear resistances, and especially impact resistance with higher toughness and a reduced cracking tendency. The improved hardfacing materials will find wide applications in machinery, mining, agriculture, construction, and oil and gas industries, and especially on various earth boring tools such as drill bits, reamers, drill collars, drill pipes, etc.

While the foregoing written description of the disclosure enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiments, methods, and examples, but by all embodiments and methods within the scope and spirit of the disclosure as claimed.

The invention claimed is:

1. A hardfacing material comprising: a carbide phase comprising tungsten carbide particles having a barrier coating disposed thereon, and a binder alloy, wherein the tungsten carbide particles are selected from the group consisting of cast tungsten carbide, carburized tungsten carbide, carburized cast tungsten carbide, macro-crystalline tungsten carbide and sintered tungsten carbide; wherein the barrier coating is selected from the group consisting of carbides, borides, nitrides carbonitrides, carboborides, nitroborides and carbonitroborides; wherein the metal is selected from the group consisting of titanium, niobium, zirconium, vanadium, tantalum, hafnium, chromium and aluminum; and wherein the barrier coating has a thickness larger than 1 micron.

2. The hardfacing material as defined in claim 1, wherein the tungsten carbide particles have a size larger than 20 microns.

3. The hardfacing material as defined in claim 1, wherein the barrier coating comprises multiple layers; wherein at least one layer is selected from the group consisting of metal carbides, borides, nitrides, carbonitrides, carboborides, nitroborides and carbonitrides; and wherein the metal is selected from the group consisting of titanium, niobium, zirconium, vanadium, tantalum, hafnium, chromium and aluminum.

4. The hardfacing material as defined in claim 1, wherein the hardfacing material is in any one of form selected from the group consisting of a welding or brazing tube, rod, rope, powder, paste, slurry and cloth.

5. The hard facing material as defined in claim 1, wherein the sintered tungsten carbide further comprises binders of ferrous metals selected from the group consisting of cobalt, nickel, iron and alloys thereof.

6. The hardfacing material as defined in claim 1, wherein the sintered tungsten carbide is binderless.

7. The hardfacing material as defined in claim 1, wherein the cast tungsten carbide further comprises crushed and spherical cast tungsten carbides.

8. The hardfacing material as defined in claim 1, wherein the carburized cast tungsten carbide further comprises crushed and spherical carburized cast tungsten carbides.

9. A composite composition comprising: a carbide phase comprising tungsten carbide particles having a barrier coating disposed thereon, and a binder alloy, wherein the tungsten carbide particles are selected from the group consisting of cast tungsten carbide, carburized tungsten carbide carburized cast tungsten carbide, macro-crystalline tungsten carbide and sintered tungsten carbide; wherein the barrier coating is selected from the group consisting of metal carbides, borides, nitrides, carbonitrides, carboborides, nitroborides and carbonitroborides; wherein the metal is selected from the group consisting of titanium, niobium, zirconium, vanadium, tantalum, hafnium, chromium and aluminum; and wherein the barrier coating has a thickness larger than 1 micron.

10. The composite composition as defined in claim 9, wherein the tungsten carbide particles have a size larger than 20 microns.

11. The composite composition as defined in claim 9, wherein the barrier coating comprises multiple layers; wherein at least one layer is selected from the group consisting of metal carbides, borides, nitrides, carbonitrides, carboborides, nitroborides and carbonitroborides; and wherein the metal is selected from the group consisting of titanium, niobium, vanadium, tantalum, hafnium, chromium and aluminum.

12. The hardfacing material as defined in claim 1, wherein the barrier coating is made by any one of the methods selected from the group consisting of chemical vapor deposition, physical vapor deposition and thermoreactive deposition/diffusion.

13. The composite composition as defined in claim 9, wherein the sintered tungsten carbide further comprises binders of ferrous metals selected from the group consisting of cobalt, nickel, iron and alloys thereof.

14. The composite composition as defined in claim 9, wherein the sintered tungsten carbide is binderless.

15. The composite composition as defined in claim 9, wherein the cast tungsten carbide further comprises crushed and spherical cast tungsten carbides.

16. The composite composition as defined in claim 9, wherein the carburized cast tungsten carbide further comprises crushed and spherical carburized cast tungsten carbides.

17. The composite composition as defined in claim 9, wherein the barrier coating is made by any one of the methods selected from the group consisting of chemical vapor deposition, physical vapor deposition and thermoreactive deposition/diffusion.

* * * * *